United States Patent
Koda et al.

(10) Patent No.: US 11,833,860 B2
(45) Date of Patent: Dec. 5, 2023

(54) PNEUMATIC TIRE

(71) Applicant: The Yokohama Rubber Co., LTD., Tokyo (JP)

(72) Inventors: Hiraku Koda, Kanagawa (JP); Ryohei Takemori, Kanagawa (JP); Yuki Sasaya, Kanagawa (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 0 days.

(21) Appl. No.: 17/596,010

(22) PCT Filed: May 14, 2020

(86) PCT No.: PCT/JP2020/019319
§ 371 (c)(1),
(2) Date: Dec. 1, 2021

(87) PCT Pub. No.: WO2020/246216
PCT Pub. Date: Dec. 10, 2020

(65) Prior Publication Data
US 2022/0203778 A1    Jun. 30, 2022

(30) Foreign Application Priority Data

Jun. 4, 2019  (JP) .................. 2019-104501

(51) Int. Cl.
*B60C 11/12* (2006.01)
*B60C 11/03* (2006.01)

(52) U.S. Cl.
CPC ...... *B60C 11/1281* (2013.01); *B60C 11/0302* (2013.01); *B60C 11/032* (2013.01);
(Continued)

(58) Field of Classification Search
CPC ............ B60C 11/1259; B60C 11/1263; B60C 11/1272; B60C 11/1281; B60C 11/1236;
(Continued)

(56) References Cited

U.S. PATENT DOCUMENTS

2009/0114325 A1* 5/2009 Ishizaka ............... B60C 9/2006
                                                        152/209.26
2014/0138000 A1   5/2014 Inoue
(Continued)

FOREIGN PATENT DOCUMENTS

CN   105216551 A   1/2016
CN   109219531 A   1/2019
(Continued)

OTHER PUBLICATIONS

Machine translation of JP03-090317 (no date).*

*Primary Examiner* — Justin R Fischer
*Assistant Examiner* — Philip N Schwartz
(74) *Attorney, Agent, or Firm* — Thorpe North & Western (57) ABSTRACT

Provided is a pneumatic tire. At least one land portion is defined and formed by a plurality of circumferential main grooves provided in a tread surface. A main sipe including a body portion and a chamfered portion is formed in at least one side of the body portion. A branch sipe branching from the chamfered portion is provided. The depth of the body portion is equal to or greater than the depth of the branch sipe.

19 Claims, 3 Drawing Sheets

(52) U.S. Cl.
CPC ...... *B60C 11/0306* (2013.01); *B60C 11/1236* (2013.01); *B60C 11/1259* (2013.01); *B60C 11/1263* (2013.01); *B60C 11/1272* (2013.01); *B60C 2011/1231* (2013.01); *B60C 2011/1268* (2013.01); *B60C 2011/1286* (2013.01)

(58) Field of Classification Search
CPC ............. B60C 11/0302; B60C 11/0306; B60C 11/032; B60C 2011/1268; B60C 2011/1286; B60C 2011/1231
See application file for complete search history.

(56) References Cited

U.S. PATENT DOCUMENTS

| | | | | |
|---|---|---|---|---|
| 2015/0151584 | A1* | 6/2015 | Koishikawa | B60C 11/1315 152/209.18 |
| 2018/0333990 | A1* | 11/2018 | Furusawa | B60C 11/1236 |
| 2019/0283505 | A1 | 9/2019 | Kuriyama | |
| 2020/0001655 | A1 | 1/2020 | Kouda et al. | |

FOREIGN PATENT DOCUMENTS

| | | | |
|---|---|---|---|
| EP | 0213452 | A2 * | 3/1987 |
| JP | 03090317 | A * | 4/1991 |
| JP | H10-250318 | A | 9/1998 |
| JP | 2005-271644 | A | 10/2005 |
| JP | 2006-56405 | A | 3/2006 |
| JP | 2006341688 | A * | 12/2006 |
| JP | 4589704 | B2 | 12/2010 |
| JP | 2014-237398 | | 12/2014 |
| JP | 2016107727 | A * | 6/2016 |
| JP | 2016-132358 | A | 7/2016 |
| JP | 2016-215939 | A | 12/2016 |
| JP | 2017-1584 | A | 1/2017 |
| JP | 2017-109592 | A | 6/2017 |
| JP | 2017-144760 | A | 8/2017 |
| JP | 2018-122772 | | 8/2018 |
| JP | 2018-131126 | A | 8/2018 |
| WO | WO 2014/037165 | A1 | 3/2014 |
| WO | 2015/163157 | A1 | 10/2015 |
| WO | 2017/159712 | A1 | 9/2017 |
| WO | 2019/049765 | A1 | 3/2019 |

* cited by examiner

PNEUMATIC TIRE

TECHNICAL FIELD

The present technology relates to a pneumatic tire with wet steering stability performance and dry steering stability performance enhanced in a well-balanced manner.

BACKGROUND ART

In tread pattern development, wet steering stability performance and dry steering stability performance are required to be provided in a compatible manner. However, when a groove area ratio is increased to enhance wet steering stability performance, dry steering stability performance is deteriorated due to reduction in tread rigidity.

And thus, in order to enhance wet steering stability performance, there has been a proposed technology in which increase in a groove area ratio is suppressed and a groove shape is improved in such a manner that a subsidiary groove (branch groove) or the like is formed which branches in a T shape from a lateral groove extending with a curvature in a tire width direction.

For example, a pneumatic tire has been described in which, in a land portion, a subsidiary groove branches in a T shape from a lateral main groove, the lateral main groove and the subsidiary groove extend towards a tire equatorial plane and in a tire rotation direction, and the terminating end portion of the subsidiary groove and the terminating end portion of the lateral main groove on the tire equatorial plane side are closed without opening to a circumferential main groove or a lateral main groove adjacent in a tire circumferential (Japan Patent No. 4589704). According to the pneumatic tire described above, on-snow performance can be enhanced without reducing on-ice performance.

In recent years, it has been required to establish compatibility between wet steering stability performance and dry steering stability performance at a higher level. And thus, there is room to improve a tread pattern in which the subsidiary groove described in Japan Patent No. 4589704 is formed.

SUMMARY

The present technology provides a pneumatic tire with wet steering stability performance and dry steering stability performance enhanced in a well-balanced manner.
A pneumatic tire according to an embodiment of the present technology includes at least one land portion defined and formed by a plurality of circumferential main grooves provided in a tread surface, and a main sipe provided in the land portion, the main sipe including a body portion and a chamfered portion formed in at least one side of the body portion. The pneumatic tire comprises a branch sipe branching from the chamfered portion, and a depth Dm of the body portion and a depth Db of the branch sipe satisfy Dm≥Db.

In a pneumatic tire according to an embodiment of the present technology, the branch sipe is provided in the land portion, and the relationship between the depth of the main sipe (the body portion thereof) and the depth of the branch sipe is improved. As a result, the pneumatic tire according to an embodiment of the present technology can enhance wet steering stability performance and dry steering stability performance in a well-balanced manner.

DETAILED DESCRIPTION

Pneumatic tires according to the embodiments of the present technology (Basic Embodiment and Additional Embodiments 1 to 19 described later) will be described in detail below with reference to the drawings. Note that the present technology is not limited to these embodiments. Constituents of the embodiments include components that are substantially identical or that can be substituted or easily conceived by one skilled in the art. In addition, various modes included in the embodiments can be combined as desired within the scope of obviousness by one skilled in the art.

BASIC EMBODIMENT

The Basic Embodiment of the pneumatic tire according to an embodiment of the present technology will be described below. Herein, "tire radial direction" refers to the direction orthogonal to the rotation axis of the pneumatic tire, "inner side in the tire radial direction" refers to a side toward the rotation axis in the tire radial direction, and "outer side in the tire radial direction" refers to a side away from the rotation axis in the tire radial direction. In addition, "tire circumferential direction" refers to the circumferential direction with the rotation axis as the center axis. Moreover, "tire width direction" refers to a direction parallel to the rotation axis, "inner side in the tire width direction" refers to a side toward a tire equatorial plane (tire equator line) in the tire width direction, and "outer side in the tire width direction" refers to a side away from the tire equatorial plane in the tire width direction. Note that "tire equatorial plane" refers to the plane orthogonal to the rotation axis of the pneumatic tire, the plane passing through the center of the tire width of the pneumatic tire.

Figure 1:
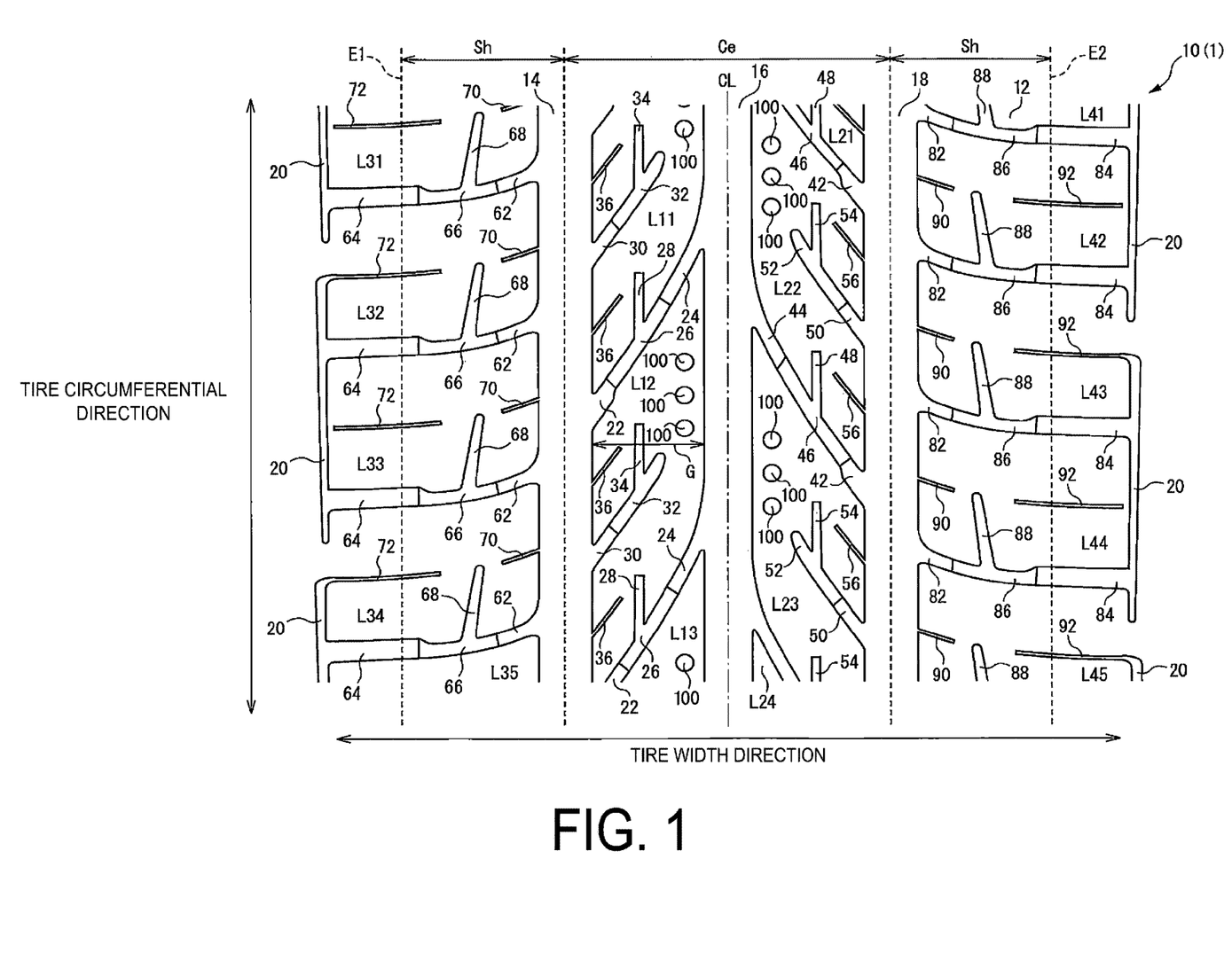
FIG. 1 is a plan view illustrating a pneumatic tire according to an embodiment of the present technology.

FIG. 1 is a plan view illustrating a pneumatic tire according to an embodiment of the present technology. Note that FIG. 1 is a plan view of the tire including ground contact edges E1 and E2 in a state where the tire is mounted on a specified rim, inflated to a specified internal pressure, and loaded with 70% of the maximum load capacity.

Here, "specified rim" refers to an "applicable rim" defined by the Japan Automobile Tyre Manufacturers Association (JATMA), a "Design Rim" defined by the Tire and Rim Association (TRA), or a "Measuring Rim" defined by the European Tyre and Rim Technical Organisation (ETRTO). Additionally, "specified internal pressure" refers to a "maximum air pressure" defined by JATMA, to the maximum value in "TIRE LOAD LIMITS AT VARIOUS COLD INFLATION PRESSURES" defined by TRA, or to "INFLATION PRESSURES" defined by ETRTO. Furthermore, "maximum load capacity" refers to the "maximum load capacity" defined by JATMA, the maximum value in "TIRE LOAD LIMITS AT VARIOUS COLD INFLATION PRESSURES" defined by TRA, or the "LOAD CAPACITY" defined by ETRTO.

A pneumatic tire 1 illustrated in FIG. 1 includes a tread portion 10. The tread portion 10 is made of a rubber material (tread rubber) and is exposed on the outermost side of the pneumatic tire 1 in the tire radial direction, with the surface thereof constituting the contour of the pneumatic tire 1. The surface of the tread portion is formed as a tread surface 12, corresponding to a surface that comes into contact with the road surface when a vehicle (not illustrated) mounting the pneumatic tire 1 is traveling.

As illustrated in FIG. 1, in the tread surface 12, circumferential main grooves 14, 16 and 18 which extend continuously in the tire circumferential direction, and circumferential subsidiary grooves 20 and 20 which extend intermittently in the tire circumferential direction in pairs with respect to the tire equatorial plane CL are provided, and land portion rows L1 (including land portions L11 to L13 in FIG. 1), L2 (including land portions L21 to L24 in FIG. 1), L3 (including land portions L31 to L35 in FIG. 1) and L4 (including land portions L41 to L45 in FIG. 1), each of which consists of a plurality of land portions arranged in the tire circumferential direction between two out of the above-mentioned grooves 14 to 20, are defined and formed. In the present embodiment, "main groove" refers to a groove in which a wear indicator is formed.

As representative examples of the land portions constituting the land portion rows L1 to L4, the land portions L12, L22, L32, and L42 will be described below.

The land portion L12 is defined and formed by providing an inclined groove 22 which extends from the circumferential main groove 14 with an inclination with respect to the tire width direction, an inclined groove 24 which extends from the circumferential main groove 16 with an inclination with respect to the tire width direction, and a main sipe 26 which bridges between the inclined grooves 22 and 24, at equal intervals in the tire circumferential direction. A branch sipe 28 extends from the main sipe 26 on one side in the tire circumferential direction and terminates within the land portion L12. In the present embodiment, "sipe" refers to a groove having a width of 1.5 mm or less on a tire surface, and this width does not include the width of a chamfered portion described below.

An inclined groove 30 which extends from the circumferential main groove 14 with an inclination with respect to the tire width direction is provided alternately with the inclined groove 22 in the tire circumferential direction. A main sipe 32 extends on an inner side in the tire width direction of the inclined groove 30 and terminates within the land portion L12. A branch sipe 34 extends from the main sipe 32 on one side in the tire circumferential direction and terminates within the land portion L12.

Moreover, a subsidiary sipe 36 which extends from the circumferential main groove 14 with an inclination with respect to the tire width direction and terminates within the land portion L12 is provided between the inclined grooves 22 and the inclined grooves 30 at regular intervals in the tire circumferential direction. Note that the land portions L11, L13 and the like constituting the land portion row L1 have the same configuration as the land portion L12 described above.

The land portion L22 is defined and formed by providing an inclined groove 42 which extends from the circumferential main groove 18 with an inclination with respect to the tire width direction, an inclined groove 44 which extends from the circumferential main groove 16 with an inclination with respect to the tire width direction, and a main sipe 46 which bridges between the inclined grooves 42 and 44, at equal intervals in the tire circumferential direction. A branch sipe 48 extends from the main sipe 46 on one side in the tire circumferential direction and terminates within the land portion L22.

An inclined groove 50 which extends from the circumferential main groove 18 with an inclination with respect to the tire width direction is provided alternately with the inclined groove 42 in the tire circumferential direction. A main sipe 52 extends on an inner side in the tire width direction of the inclined groove 50 and terminates within the land portion L22. A branch sipe 54 extends from the main sipe 52 on one side in the tire circumferential direction and terminates within the land portion L22.

Moreover, a subsidiary sipe 56 which extends from the circumferential main groove 18 with an inclination with respect to the tire width direction and terminates within the land portion L22 is provided between the inclined grooves 42 and the inclined grooves 50 at regular intervals in the tire circumferential direction. Note that the land portions L21, L23, L24 and the like constituting the land portion row L2 have the configuration identical to the land portion L22 described above.

The land portion L32 is defined and formed by providing a lug groove 62 which extends from the circumferential main groove 14 in a substantially tire width direction, a lug groove 64 which extends from the circumferential subsidiary groove 20 in a substantially tire width direction, and a main sipe 66 which bridges between the lug grooves 62 and 64, at equal intervals in the tire circumferential direction. A branch sipe 68 extends from the main sipe 66 on one side in the tire circumferential direction and terminates within the land portion L32.

Moreover, a lug groove 70 which extends from the circumferential main groove 14 in a substantially tire width direction and terminates within the land portion L32 is provided between the lug grooves 62 and 62 at regular intervals in the tire circumferential direction. A lug groove 72 is formed on an extension line of the lug groove 70 on outer side in the tire width direction and communicates with the circumferential subsidiary groove 20.

As illustrated in FIG. 1, the end portion of the lug groove 72 on outer side in the tire width direction communicates with the circumferential subsidiary groove 20 in the land portion L32. However, in the land portions L31 and L33 adjacent in the tire circumferential direction to the land portion L32, the end portion of the lug groove 72 on outer side in the tire width direction terminates within the land portion without communicating with the circumferential subsidiary groove 20. Moreover, the land portions L31 and L33 in which the lug groove 72 does not communicate with the circumferential subsidiary groove 20 are defined and formed by two lug grooves 64 and 64 which communicate with each other through the circumferential subsidiary groove 20. Note that land portions constituting the land portion row L3 other than the land portions L31 to L33 described above have a configuration in which land portions similar to the land portions L31 and L32 are alternately disposed in the tire circumferential direction.

The land portion L42 is defined and formed by providing a lug groove 82 which extends from the circumferential main groove 18 in a substantially tire width direction, a lug groove 84 which extends from the circumferential subsidiary groove 20 in a substantially tire width direction, and a main sipe 86 which bridges between the lug grooves 82 and 84, at equal intervals in the tire circumferential direction. A branch sipe 88 extends from the main sipe 86 on one side in the tire circumferential direction and terminates within the land portion L42.

Moreover, a lug groove 90 which extends from the circumferential main groove 18 in a substantially tire width direction and terminates within the land portion L42 is provided between the lug grooves 82 and 82 at regular intervals in the tire circumferential direction. A lug groove 92 is formed on an extension line of the lug groove 90 on outer side in the tire width direction, and the end portion of the lug groove 92 on outer side in the tire width direction terminates within the land portion L42.

As illustrated in FIG. 1, the end portion of the lug groove 92 on outer side in the tire width direction does not communicate with the circumferential subsidiary groove 20 in the land portion L42. However, in the land portions L41 and L43 adjacent in the tire circumferential direction to the land portion L42, the end portion of the lug groove 92 on outer side in the tire width direction communicates with the circumferential subsidiary groove 20. Moreover, the land portions L42 and L44 in which the lug groove 92 does not communicate with the circumferential subsidiary groove 20 are defined and formed by two lug grooves 84 and 84 that communicate with each other through the circumferential subsidiary groove 20. Note that land portions constituting the land portion row L4 other than the land portions L41 to L44 described above have a configuration in which land portions similar to the land portions L41 and L42 are alternately disposed in the tire circumferential direction.

Figure 2:
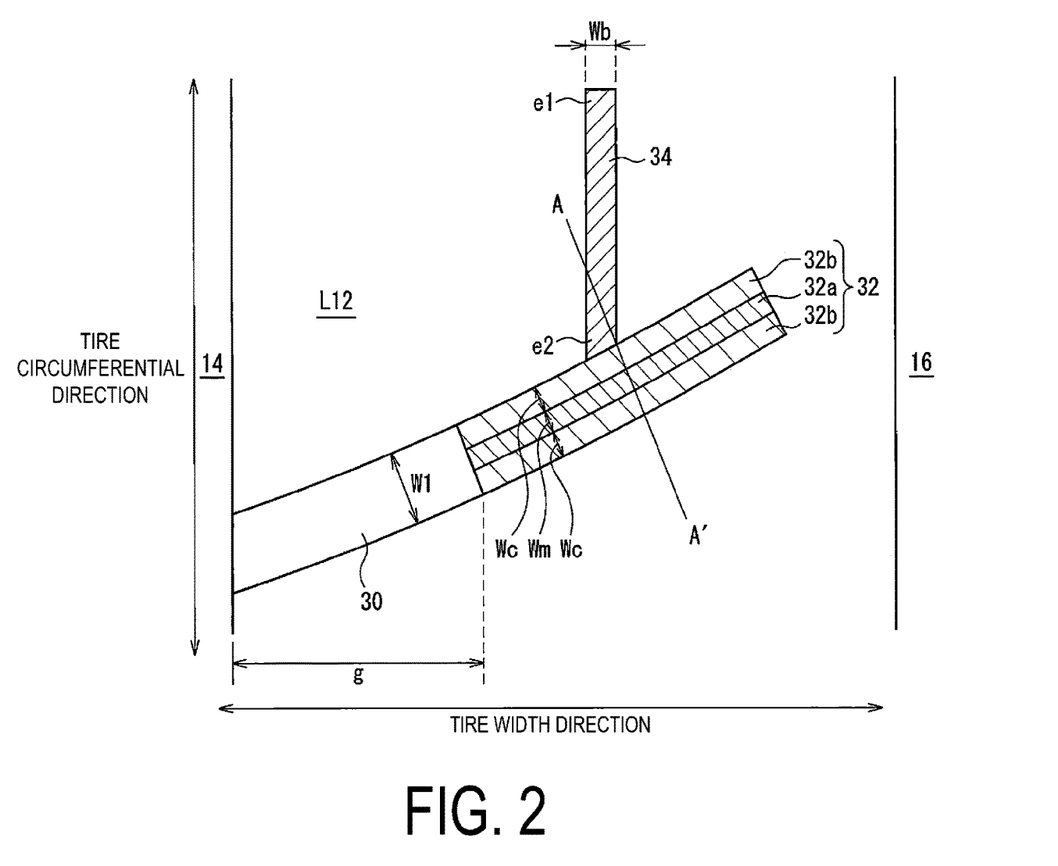
FIG. 2 is an enlarged plan view illustrating an inclined groove, a main sipe, and a branch sipe illustrated in FIG. 1.
Figure 3:
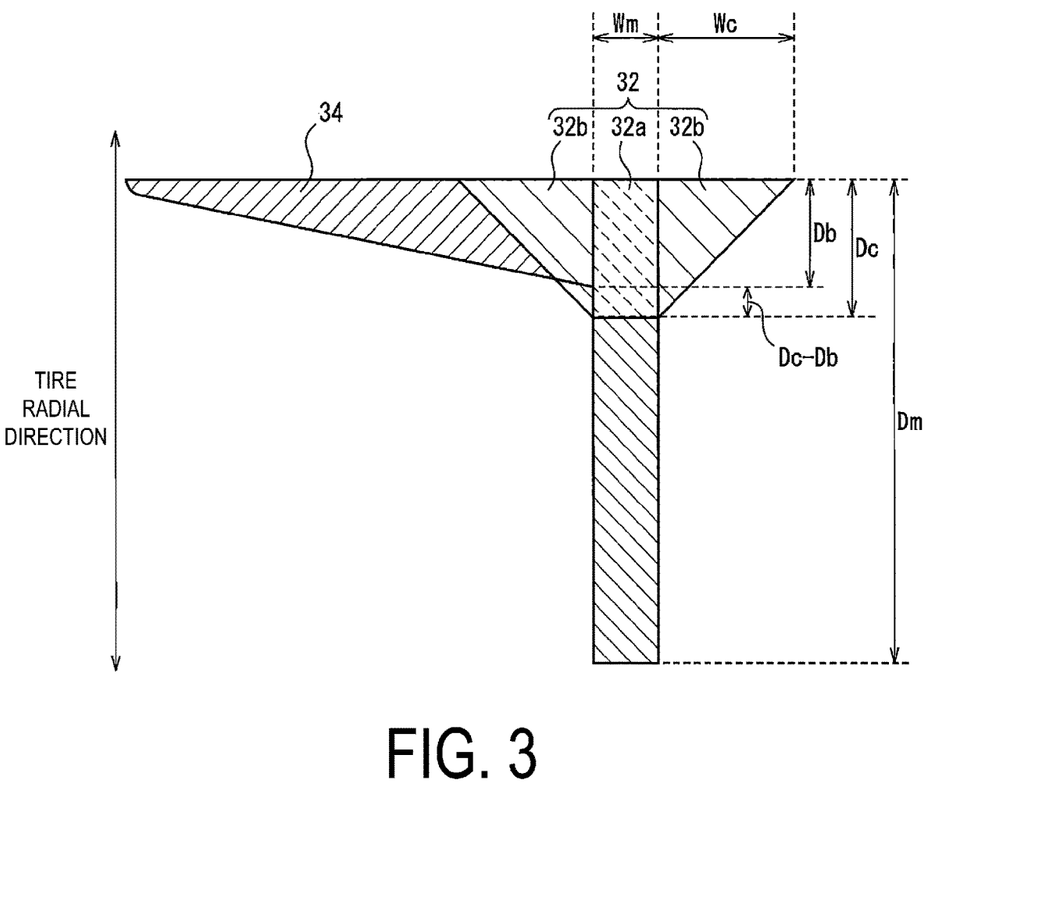
FIG. 3 is a cross-sectional view along the line A-A' illustrated in FIG. 2.

FIG. 2 is an enlarged plan view illustrating the inclined groove 30, the main sipe 32, and the branch sipe 34 which define and form the land portion L12 illustrated in FIG. 1. FIG. 3 is a cross-sectional view along the line A-A' illustrated in FIG. 2, specifically, a cross-sectional view taken along a direction perpendicular to the extension direction of the main sipe 32. Here, the main sipe 32 includes a body portion 32a and two chamfered portions 32b and 32b disposed in a direction perpendicular to the longitudinal direction of the body portion 32a (on both sides of the body portion 32a).

On the premise of having the above-mentioned configuration illustrated in FIG. 1, as illustrated in FIG. 2, the pneumatic tire according to the present embodiment is provided with a branch sipe 34 that branches from one chamfered portion 32b in the land portion L12.

Besides, in the pneumatic tire according to the present embodiment, as illustrated in FIG. 3, the depth Dm of the main sipe 32 (substantially the depth of the body portion 32a) is equal to or more than the depth Db of the branch sipe 34. Here, as illustrated in FIG. 3, the depth Db of the branch sipe 34 refers to a tire radial direction dimension from a tire surface on the assumption that the branch sipe 34 is not present, to an intersection point between an extension line of a profile line of the branch sipe 34 on inner side in the tire radial direction and a profile line of the body portion 32a of the main sipe 32.

Effects

In the present embodiment, by providing the branch sipe 34 that branches from the chamfered portion 32b in the land portion L12, excessive reduction in drainage performance can be prevented and the rigidity of the land portion L12 can be increased when compared to the case where the branch sipe 34 is a normal groove (Effect 1).

Moreover, in the present embodiment, the depth Dm of the main sipe 32 is set to be equal to or more than the depth Db of the branch sipe 34. Thus, when the depth Dm of the main sipe 32 is equivalent to that in the related art, the depth Db of the branch sipe 34 can be relatively reduced, excessive reduction in drainage performance can be prevented and the rigidity of the land portion L12 can be increased (Effect 2).

Accordingly, in the pneumatic tire according to the present embodiment, by providing the branch sipe in the land portion and improving the relationship between the depth of the main sipe and the depth of the branch sipe, the Effects 1 and 2 described above interact with each other to enhance wet steering stability performance and dry steering stability performance in a well-balanced manner.

The pneumatic tire according to the present embodiment described above is the tire in which the matters specifying the technology related to the formation of a branch sipe described above and the matters specifying the technology related to the relationship between the depth of a main sipe and the depth of a branch sipe are applied to, for example, a predetermined sipe group (main sipe 32, branch sipe 34) illustrated in FIG. 1. However, the present embodiment is not limited to such an example, and the predetermined sipe group described above can be at least any one of a sipe group (main sipe 32, branch sipe 34), a sipe group (main sipe 26, branch sipe 28), a sipe group (main sipe 46, branch sipe 48), a sipe group (main sipe 52, branch sipe 54), a sipe group (main sipe 66, branch sipe 68), and a sipe group (main sipe 86, branch sipe 88) illustrated in FIG. 1. With the extension of the foregoing range of application to sipe groups, the Effects described above (improvement of wet steering stability performance and dry steering stability performance) can be achieved at a higher level, and when applied to all the sipe groups, the Effects described above are dramatically increased.

In the example illustrated in FIG. 1, the main sipe 32 communicates with the inclined grooves 30. However, the present embodiment is not limited thereto and also includes a configuration in which there is no inclined groove 30 and only the main sipe 32 and the branch sipe 34 are present in a land portion without communicating with other grooves. The same applies to the sipe group (main sipe 26, branch sipe 28), the sipe group (main sipe 46, branch sipe 48), the sipe group (main sipe 52, branch sipe 54), the sipe group (main sipe 66, branch sipe 68), and the sipe group (main sipe 86 and branch sipe 88).

Moreover, as illustrated in FIG. 1, the pneumatic tire according to the present embodiment (FIGS. 1 to 3) is an example in which three circumferential main grooves are present, but is not limited thereto and may include three to five circumferential main grooves. The groove width of the circumferential main groove (dimension in a direction perpendicular to an extension direction of the groove) can be 10 to 35% of a ground contact width in a state where a load of 70% of the maximum load capacity is applied. The depth of the circumferential main groove can be 4.5 mm to 11.0 mm. The number of the circumferential main grooves, the total groove width of the circumferential main grooves, and the depth of the circumferential main groove are set in consideration of the rigidity and the drainage performance of land portions.

Furthermore, in the pneumatic tire according to the present embodiment, as illustrated in FIGS. 2 and 3, the chamfered portions 32b and 32b are formed in both sides of the body portion 32a of the main sipe 32. However, the present embodiment is not limited thereto and may include a chamfered portion only in one side of the body portion 32a. When the chamfered portion is provided only in one side of the body portion 32a, the rigidity of a land portion is increased and thus dry steering stability performance is relatively enhanced, and when a chamfered portion is provided in both sides of the body portion 32a, drainage performance is enhanced and thus wet steering stability is relatively enhanced.

Besides, in the pneumatic tire according to the present embodiment (FIGS. 1 to 3), as illustrated in FIG. 3, the chamfered portions 32b and 32b are triangular in shape in the cross-sectional view. However, the present embodiment is not limited thereto and chamfered portions may be quadrangular or fan-shaped. Note, however, that in the case where a depth Dc and a width Wc of the chamfered portion 32b illustrated in FIG. 3 are constant, the rigidity of the land portion is increased and thus dry steering stability performance is relatively enhanced when the cross-sectional shape of the chamfered portion is triangular, and drainage performance is increased and thus dry steering stability performance is relatively enhanced when the cross-sectional shape is quadrangular.

Although not entirely illustrated, the pneumatic tire according to the present embodiment described above has the same meridian cross-sectional shape as a conventional pneumatic tire. That is, in a meridian cross-sectional view, the pneumatic tire according to the present embodiment includes bead portions, sidewall portions, shoulder portions, and the tread portion in that order from the inner side to the outer side in the tire radial direction. For example, in a meridian cross-sectional view, the pneumatic tire includes a carcass layer that extends from the tread portion to the bead portions on both sides and is wound around a pair of bead cores and the above-described belt layer and a belt cover layer on the outer side in the tire radial direction of the carcass layer.

The pneumatic tire according to the present embodiment is obtained through various general manufacturing processes, in other words, a step of mixing tire materials, a step of processing the tire materials, a step of molding a green tire, a vulcanization step, an inspection step after vulcanization, and the like. When manufacturing the pneumatic tire according to the present embodiment, for example, recess portions and protrusion portions corresponding to the tread pattern illustrated in FIG. 1 are formed in the inner wall of a vulcanization mold, and vulcanization is performed by using this mold.

Additional Embodiments

Next, Additional Embodiments 1 to 19 that can optionally be implemented on the above-described Basic Embodiment of the pneumatic tire according to an embodiment of the present technology will be described.

Additional Embodiment 1

In Basic Embodiment, the depth Dc of the chamfered portion and the depth Db of the branch sipe illustrated in FIG. 3 preferably satisfy 0≤Dc−Db≤Db×0.5 (Additional Embodiment 1).

By setting the difference in depth (Dc−Db) illustrated in FIG. 3 to be 0 or more, in other words, by setting the depth Db of the branch sipe 34 to be less than the depth Dc of the chamfered portion 32b, a profile line of the body portion 32a of the main sipe 32 and a profile line of the branch sipe 34 on inner side in the tire radial direction do not directly intersect with each other, in other words, the body portion 32a and the branch sipe 34 do not have direct connection with each other, and thus the chamfered portion 32b can be surely interposed between the body portion 32a and the branch sipe 34. Accordingly, a level difference from the body portion 32a to the branch sipe 34 can be eliminated and the rigidity of the land portion can be increased, and thus wet steering stability performance and dry steering stability performance can be achieved at a higher level in a compatible manner.

Meanwhile, by setting the difference in depth (Dc−Db) illustrated in FIG. 3 to be equal to or less than half the depth Db of the branch sipe 34, a groove volume of the branch sipe 34 can be increased and, in particular, wet steering stability performance can be enhanced.

Additional Embodiment 2

In Basic Embodiment or an embodiment in which Additional Embodiment 1 is added to Basic Embodiment, the main sipe illustrated in FIGS. 1 to 3 preferably communicates with at least one circumferential main groove (Additional Embodiment 2).

Examples in which the main sipe communicates with one circumferential main groove include the sipe group (main sipe 32, branch sipe 34) illustrated in FIG. 1, and examples in which the main sipe communicates with two circumferential main grooves include the sipe group (main sipe 26, branch sipe 28) illustrated in FIG. 1. As described above, these sipe groups alone can be present in land portions. However, when they communicate with at least one circumferential main groove as in the present embodiment, drainage performance can be further increased and wet steering stability performance can be further enhanced.

Additional Embodiment 3

In Basic Embodiment or an embodiment in which at least either of Additional Embodiments 1 or 2 is added to Basic Embodiment, as illustrated in FIG. 2, a width Wb of the branch sipe is preferably more than a width Wm of the body portion of the main sipe (Additional Embodiment 3). Here, "width Wb of the branch sipe" refers to the dimension of the branch sipe on a tire surface in a direction perpendicular to the extension direction of the branch sipe, and "width Wm of the main sipe" refers to the dimension of the main sipe on the tire surface in a direction perpendicular to the extension direction of the main sipe. Note that, when the sipe is not constant in width in its extension direction, the maximum width is considered as its width in the present embodiment.

By setting the width Wb of the branch sipe to be more than the width Wm of the body portion of the main sipe, as illustrated in FIG. 2, the width of the body portion 32a including the chamfered portion 32b in at least one side thereof can be relatively reduced, while the width of the branch sipe 34 with no chamfered portion formed adjacent thereto can be relatively increased. As a result, improvement in drainage performance and suppression of decrease in block rigidity can be achieved more efficiently on the entire tread surface, and thus wet steering stability performance and dry steering stability performance can be further enhanced in a well-balanced manner.

Additional Embodiment 4

In an embodiment in which Additional Embodiment 3 is added to Basic Embodiment, the width Wb of the branch sipe and the width Wm of the body portion of the main sipe preferably satisfy Wm×1.5≤Wb≤Wm×4.0 (Additional Embodiment 4).

By setting the width Wb of the branch sipe to be equal to or more than 1.5 times the width Wm of the body portion of the main sipe, drainage performance can be increased and particularly wet steering stability performance can be further enhanced. On the other hand, by setting the width Wb of the branch sipe to be equal to or less than 4.0 times the width Wm of the body portion of the main sipe, the rigidity of the land portion can be further increased and particularly dry steering stability performance can be further enhanced. Note that by setting the width Wb of the branch sipe to be 1.7 times or more and 3.5 times or less the width Wm of the body portion of the main sipe, each of the above-mentioned effects can be achieved at a higher level.

Additional Embodiment 5

In Basic Embodiment or an embodiment in which at least any one of Additional Embodiments 1 to 4 is added to Basic Embodiment, the width Wc of the chamfered portion and the width Wb of the branch sipe preferably satisfy Wb×1.3≤Wc≤Wb×3.0 (Additional Embodiment 5). Here, "width Wc of the chamfered portion" refers to the dimension of the chamfered portion on a tire surface in a direction perpendicular to the extension direction of the chamfered portion. When the chamfered portion is not constant in width in its extension direction, the maximum width is considered as its width in the present embodiment. Furthermore, as illustrated in FIGS. 2 and 3, when the chamfered portions 32b and 32b are present in both sides of the body portion 32a, the width of the chamfered portion refers to the sum of the width values of the chamfered portions in both sides.

By setting the width Wc of the chamfered portion to be equal to or more than 1.3 times the width Wb of the branch sipe, drainage performance can be increased and particularly wet steering stability performance can be further enhanced. On the other hand, by setting the width Wc of the chamfered portion to be equal to or less than 3.0 times the width Wb of the branch sipe, the rigidity of the land portion can be further increased and particularly dry steering stability performance can be further enhanced. Note that by setting the width Wc of the chamfered portion to be 1.5 times or more and 2.5 times or less the width Wb of the branch sipe, each of the above-mentioned effects can be achieved at a higher level.

Additional Embodiment 6

In Basic Embodiment or an embodiment in which at least any one of Additional Embodiments 1 to 5 is added to Basic Embodiment, the width Wb of the branch sipe preferably satisfies 0.5 mm≤Wb≤3.0 mm (Additional Embodiment 6).

By setting the width Wb of the branch sipe to be 0.5 mm or more, drainage performance can be increased and particularly wet steering stability performance can be further enhanced. On the other hand, by setting the width Wb of the branch sipe to be 3.0 mm or less, the rigidity of the land portion can be further increased and particularly dry steering stability performance can be further enhanced. Note that by setting the width Wb of the branch sipe to be 0.6 mm or more and 2.0 mm or less, each of the above-mentioned effects can be achieved at a higher level, and by setting it to be 0.7 mm or more and 1.5 mm or less, each of the effects can be achieved at an extremely high level.

Additional Embodiment 7

In Basic Embodiment or an embodiment in which at least any one of Additional Embodiment 1 to 6 is added to Basic Embodiment, the depth Db of the branch sipe and the depth Dc of the chamfered portion preferably satisfy Dc×0.5≤Db≤Dc (Additional Embodiment 7). Here, "depth Dc of the chamfered portion" refers to the maximum depth measured from a tire surface (on the assumption that the chamfered portion is not present).

By setting the depth Db of the branch sipe to be equal to or more than 0.5 times the depth Dc of the chamfered portion, drainage performance can be increased and particularly wet steering stability performance can be further enhanced. On the other hand, by setting the depth Db of the branch sipe to be equal to or less than the depth Dc of the chamfered portion, the rigidity of the land portion can be further increased and particularly dry steering stability performance can be further enhanced. Note that by setting the depth Db of the branch sipe to be equal to or more than 0.7 times the depth Dc of the chamfered portion, the above-mentioned effects can be achieved at a higher level.

Additional Embodiment 8

In Basic Embodiment or an embodiment in which at least any one of Additional Embodiment 1 to 7 is added to Basic Embodiment, the depth Dm of the body portion of the main sipe and the depth Db of the branch sipe preferably satisfy Dm×0.2≤Db≤Dm×0.9 (Additional Embodiment 8). Here, "depth Dm of the body portion of the main sipe" refers to the maximum depth measured from a tire surface (on the assumption that the body portion of the main sipe is not present).

By setting the depth Db of the branch sipe to be equal to or more than 0.2 times the depth Dm of the body portion of the main sipe, drainage performance can be increased and particularly wet steering stability performance can be further enhanced. On the other hand, by setting the depth Db of the branch sipe to be equal to or less than 0.9 times the depth Dm of the body portion of the main sipe, the rigidity of the land portion can be further increased and particularly dry steering stability performance can be further enhanced. Note that by setting the depth Db of the branch sipe to be 0.3 times or more and 0.8 times or less the depth Dm of the body portion of the main sipe, each of the above-mentioned effects can be achieved at a higher level.

Additional Embodiment 9

In Basic Embodiment or an embodiment in which at least any one of Additional Embodiments 1 to 8 is added to Basic Embodiment, the depth Db of the branch sipe is preferably 0.8 mm or more and 2.5 mm or less (Additional Embodiment 9).

By setting the depth Db of the branch sipe to be 0.8 mm or more, drainage performance can be increased and particularly wet steering stability performance can be further enhanced. On the other hand, by setting the depth Db of the branch sipe to be 2.5 mm or less, the rigidity of the land portion can be further increased and particularly dry steering stability performance can be further enhanced. Note that by setting the depth Db of the branch sipe to be 1.0 mm or more and 2.0 mm or less, each of the above-mentioned effects can be achieved at a higher level.

Additional Embodiment 10

In Basic Embodiment or an embodiment in which at least any one of Additional Embodiments 1 to 9 is added to Basic Embodiment, an absolute value |θb| of an inclination angle of the branch sipe with respect to the tire circumferential direction is preferably 5° or less (Additional Embodiment 10). Here, the phrase stating that the absolute value |θb| of the inclination angle is 5° or less means that the inclination angle is 5° or less regardless of whether the inclination angle is formed clockwise or counterclockwise with respect to the tire circumferential direction. The same applies to absolute values of other inclination angles described below.

On the premise of forming grooves having the identical width and the identical depth in a tread surface, flexing of a land portion toward the tire circumferential direction during traveling of a vehicle is most unlikely to occur when grooves are formed in the tire circumferential direction and most likely to occur when grooves are formed in the tire width direction. In consideration of these phenomena, by setting the absolute value |θb| of the inclination angle of the branch sipe with respect to the tire circumferential direction to be 5° or less, flexing of a land portions during traveling of a vehicle can be suppressed at a high level, and thus wet steering stability performance and dry steering stability performance can be further increased.

Additional Embodiment 11

In Basic Embodiment or an embodiment in which at least any one of Additional Embodiments 1 to 10 is added to Basic Embodiment, a one-sided main sipe which communicates only with a circumferential main groove on one side and a two-sided main sipe which communicates with circumferential main grooves on both sides are preferably provided alternately in the tire circumferential direction (Additional Embodiment 11). Specifically, "one-sided main sipe" refers the main sipe 32 illustrated in FIG. 1 for example, and the one-sided main sipe 32 communicates only with the circumferential main groove 14 through the inclined groove 30. In contrast, "two-sided main sipe" refers to the main sipes 26 illustrated in FIG. 1 for example, and the two-sided main sipe 26 communicates with the circumferential main grooves 14 and 16 through the inclined grooves 22 and 24, respectively.

As illustrated in FIG. 1, by providing the one-sided main sipe 32 which communicates only with the circumferential main groove 14 in one side and the two-sided main sipe 26 which communicates with the circumferential main grooves 14 and 16 in both sides alternately in the tire circumferential direction, drainage performance can be increased compared to the case where only one-sided main sipes are disposed in the tire circumferential direction, and the rigidity of the land portion can be increased compared to the case where only two-sided main sipes are disposed in the tire circumferential direction. As a result, according to the present embodiment, drainage performance and the rigidity of the land portion can be further increased efficiently in a compatible manner, and thus wet steering stability performance and dry steering stability performance can be further enhanced in a well-balanced manner.

Additional Embodiment 12

In an embodiment in which Additional Embodiment 11 is added to Basic Embodiment, at least one subsidiary sipe is preferably provided between the one-sided main sipe and the two-sided main sipe in the tire circumferential direction (Additional Embodiment 12). Here, specific combinations of the one-sided main sipe, the two-sided main sipe and the subsidiary sipe that comply with the present embodiment include a combination (one-sided main sipe 32, two-sided main sipe 26, subsidiary sipe 36) and a combination (one-sided main sipe 52, two-sided main sipe 46, subsidiary sipe 56) illustrated in FIG. 1.

By providing at least one subsidiary sipe between the one-sided main sipe and the two-sided main sipe in the tire circumferential direction, drainage performance can be increased, and thus wet steering stability performance can be further enhanced.

In consideration of drainage performance and the rigidity of the land portion, a width of the subsidiary sipe is preferably 0.5 mm or more and 2.0 mm or less, and a depth of the subsidiary sipe is preferably 2.5 mm or more and 7.0 mm or less.

Additional Embodiment 13

In Basic Embodiment or an embodiment in which at least any one of Additional Embodiments 1 to 12 is added to Basic Embodiment, as illustrated in FIG. 1, when a ground contact region (a region on inner side in the tire width direction of ground contact edges E1 and E2) is equally divided into four regions in the tire width direction and two regions among the four regions at the center in the tire width direction are regarded as a center region Ce, the main sipe and the branch sipe are preferably provided in the center region Ce (Additional Embodiment 13). Here, specific combinations of the main sipe and the branch sipe that comply with the present embodiment include a combination (main sipe 32, branch sipe 34), a combination (main sipe 26, branch sipe 28), a combination (main sipe 52, branch sipe 54), and a combination (main sipe 46, branch sipe 48) illustrated in FIG. 1.

By providing the main sipe and the branch sipe in the center region Ce which highly contributes to drainage, the balance between drainage performance and the rigidity of the land portion can be preferentially enhanced in the center region Ce, and particularly wet steering stability performance can be enhanced efficiently.

Additional Embodiment 14

In Basic Embodiment or an embodiment in which at least any one of Additional Embodiments 1 to 13 is added to Basic Embodiment, the inclined groove or the lug groove is preferably provided between the circumferential main groove and the main sipe, and a width Wl of the inclined groove or the lug groove and a width (Wm+2Wc) of the main sipe preferably satisfy Wl×0.8≤(Wm+2Wc)≤Wl×1.2 (Additional Embodiment 14). In the present specification, among grooves which extend from the circumferential main grooves and communicate with the main sipes illustrated in FIG. 1, those which are formed in the center region Ce are referred to as the inclined grooves (inclined grooves 22, 24, 30, 50, 42 and 44) and those which are formed in a shoulder region Sh are referred to as the lug grooves (lug grooves 62, 64, 82 and 84). Thus, specific combinations of the circumferential main groove, the main sipe and the inclined groove or the lug groove that comply with the present embodiment include a combination (circumferential main groove 14, main sipe 32, inclined groove 30), a combination (circumferential main grooves 14, 16, main sipe 26, inclined grooves 22, 24), a combination (circumferential main groove 18, main sipe 52, inclined groove 50), a combination (circumferential main grooves 16, 18, main sipe 46, inclined grooves 42, 44), a combination (circumferential main groove 14, main sipe 66, lug groove 62), and a combination (circumferential main groove 18, main sipe 86, lug groove 82) illustrated in FIG. 1. Note that the width Wl of the inclined groove or the lug groove refers to the maximum dimension of the groove in a direction perpendicular to the extension direction of the groove.

By providing the inclined groove or the lug groove (hereinafter referred to as inclined groove or the like) between the circumferential main groove and the main sipe, drainage performance can be further increased, and thus particularly wet steering stability performance can be further enhanced. In the present embodiment, in particular, the width Wc of the chamfered portion is 0.8 times or more and 1.2 times or less the width Wl of the inclined groove or the like, in other words, the width Wc of the chamfered portion is almost identical to the width Wl of the inclined groove or the like. Accordingly, uneven wear at or near the boundary between the chamfered portion and the inclined groove or the like can be reduced, and thus durability performance can be enhanced.

Note that by setting the width Wc of the chamfered portion to be 0.9 times or more and 1.1 times or less the width Wl of the inclined groove or the like, the above-mentioned effects can be achieved at a higher level. Furthermore, by providing the body portion 32a of the main sipe 32 on an extension line of the width direction center line (not illustrated) of the inclined groove 30 illustrated in FIG. 2, the difference in rigidity between a portion near the inclined groove 30 and a portion near the main sipe 32 can be reduced, uneven wear at or near the boundary between the chamfered portion 32b and the inclined groove 30 can be further reduced, and thus durability performance can be further enhanced.

Additional Embodiment 15

In Basic Embodiment or an embodiment in which at least any one of Additional Embodiments 1 to 14 is added to Basic Embodiment, the dimension of the inclined groove or the like in the tire width direction (for example, the dimension indicated with a reference sign g for the inclined grooves 30 illustrated in FIG. 2) is preferably 20% or more and 40% or less of the dimension of the land portion L12 in the tire width direction (the dimension indicated with a reference sign G in FIG. 1) (Additional Embodiment 15).

By setting the dimension of the inclined groove or the like in the tire width direction to be 20% or more of the dimension of the land portion in the tire width direction, drainage performance can be enhanced and particularly wet steering stability performance can be further enhanced. On the other hand, by setting the dimension of the inclined groove or the like in the tire width direction to be 40% or less of the dimension of the land portion in the tire width direction, the rigidity of the land portion can be further increased and particularly dry steering stability performance can be further enhanced. Note that by setting the dimension of the inclined groove or the like in the tire width direction to be 25% or more and 35% or less of the dimension of the land portion in the tire width direction, each of the above-mentioned effects can be achieved at a higher level.

Additional Embodiment 16

In an embodiment in which at least either of Additional Embodiments 14 and 15 is added to Basic Embodiment, the depth Dm of the body portion of the main sipe is preferably 0.2 times or more and 0.8 times or less a depth Dl of the inclined groove or the like (Additional Embodiment 16). Here, "depth Dl of the inclined groove or the like" refers to the maximum depth measured from a tire surface (on the assumption that the inclined groove or the like is not present).

By setting the depth Dm of the body portion of the main sipe to be 0.2 times or more the depth Dl of the inclined groove or the like, drainage performance can be increased and particularly wet steering stability performance can be further enhanced. On the other hand, by setting the depth Dm of the body portion of the main sipe to be 0.8 times or less the depth Dl of the inclined groove or the like, the rigidity of the land portion can be further increased and particularly dry steering stability performance can be further enhanced. Note that by setting the depth Dm of the body portion of the main sipe to be 0.3 times or more and 0.6 times or less the depth Dl of the inclined groove or the like, each of the above-mentioned effects can be achieved at a higher level.

Additional Embodiment 17

In Basic Embodiment or an embodiment in which at least any one of Additional Embodiments 1 to 16 is added to Basic Embodiment, as illustrated in FIG. 1, in a state where a load of 70% of the maximum load capacity is applied, when the ground contact region is divided into four regions in the tire width direction and two regions among the four regions on both outer sides in the tire width direction are regarded as shoulder regions Sh, the branch sipe is preferably provided in both of the shoulder regions (Additional Embodiment 17). Specific branch sipes that comply with the present embodiment include branch sipes 68 and 88.

By providing the branch sipe in both of the shoulder regions Sh, drainage performance can be further increased, and thus particularly wet steering stability performance can be further enhanced.

Note that, as illustrated in FIGS. 2 and 3, the branch sipe provided in the shoulder region Sh can be of a type that branches and extends from the inclined groove 30 with no main sipe 32 formed as well as of a type that branches and extends from the chamfered portion 32b of the main sipe 32. The width and the depth of the branch sipe provided in the shoulder region Sh can be identical to the width and the depth of the branch sipe provided in the center region described above.

The absolute value of the inclination angle of the branch sipe provided in the shoulder regions Sh with respect to the tire circumferential direction is preferably 15° or less in consideration of the flexing of the land portion around the branch sipe toward the tire circumferential direction during traveling of a tire. Besides, the absolute value of the inclination angle of the lug groove provided in the shoulder regions Sh with respect to the tire circumferential direction is preferably 60° or more and 90° or less in consideration of drainage performance in the tire width direction and a grip force caused by the edge effect of the land portion adjacent to the lug groove during traveling of a tire.

Additional Embodiment 18

In Basic Embodiment or an embodiment in which at least any one of Additional Embodiments 1 to 17 is added to Basic Embodiment, preferably, a rotation direction is designated, and in FIG. 2, an end portion e1 of the branch sipe 34 the opposite side of the chamfered portion 32b is provided on a leading side, and an end portion e2 of the branch sipe 34 on the side of the chamfered portion 32b is provided on a trailing side (Additional Embodiment 18).

When a rotation direction is designated, and when the end portion e1 and the end portion e2 illustrated in FIG. 2 are on the leading side and on the trailing side respectively, a drainage passage is formed, during traveling of a vehicle, in the order of the end portion e1, the end portion e2, the main sipe 32, the inclined groove 30 and the circumferential main groove 14 enabling efficient drainage, and wet steering stability performance can be further enhanced.

Note that, in order to further increase the drainage efficiency of the drainage passage, the angle formed between the extension direction of the main sipe 32 and the extension direction of the branch sipe 34 illustrated in FIG. 2 is preferably 45° or less. However, in order to suppress the reduction in the rigidity of the land portion sandwiched between the main sipe 32 and the branch sipe 34, the angle formed by the sipes 32 and 34 is preferably 20° or more. For the same reason, the angle formed between the circumferential main groove 14 and the main sipe 32 illustrated in FIG. 2 is preferably 20° or more and 40° or less.

Additional Embodiment 19

In Basic Embodiment or an embodiment in which at least any one of Additional Embodiments 1 to 18 is added to Basic Embodiment, as illustrated in FIG. 1, dimples 100 are preferably provided in at least the center region Ce (Additional Embodiment 19). Here, "dimple" refers to a recess portion from a tread surface towards the inner side in the tire radial direction excluding grooves and sipes.

By providing the dimples 100 in at least the center region Ce, drainage performance in at least the center region Ce is increased, and thus wet steering stability performance can be further enhanced.

Note that a diameter of the circumscribing circle of the dimple can be 2.0 mm or more and 6.0 mm or less, and a depth of the dimple can be 0.5 mm or more and 3.0 mm or less. Furthermore, the dimple can have any shape such as an n-sided polygon (n is an integer of 3 or more), a circle, an ellipse, a star, or a drop shape in a plan view of a tire.

EXAMPLES

Pneumatic tires according to Examples 1 to 20 and Conventional Example having a tire size of 205/55R16 (specified by JATMA) and having the shapes illustrated in FIGS. 1 to 3 are manufactured. Note that the detailed conditions of these pneumatic tires are as shown in Tables 1 to 4 below. In Tables 1 to 4, "Dm" indicates the depth of a body portion, "Db" indicates the depth of a branch sipe, "Dc" indicates the depth of a chamfered portion, "Wb" indicates the width of a branch sipe, "Wm" indicates the width of a body portion, "Wc" indicates the width of a chamfered portion, "|θb|" indicates the absolute value of the inclination angle of a branch sipe with respect to a tire circumferential direction, "Ce" indicates a center region, "Wl" indicates the width of a lug groove, "Dl" indicates the depth of a lug groove, and "Sh" indicates a shoulder region. These reference signs and the like are in accordance with the descriptions described above in the present specification. Besides, when a rotation direction is designated, at the same time, an end portion of a branch sipe on the opposite side of a chamfered portion is provided on a leading side, and an end portion of the branch sipe on the side of the chamfered portion is provided on a trailing edge.

The pneumatic tires according to Examples 1 to 20 and the pneumatic tire according to Conventional Example manufactured in this manner were evaluated for wet steering stability performance and dry steering stability performance in accordance with the following procedures. Note that all performance evaluations are conducted on test tires mounted on rims having a size of 16×6.5J, inflated to an air pressure of 230 kPa, and mounted on a test vehicle having an engine displacement of 2000 cc.

Wet Steering Stability Performance

The test vehicle was driven on a test course of a wet road surface, a feeling evaluation test on steering stability performance was conducted by a test driver, and the results are expressed as index values and evaluated with Conventional Example being assigned as an index value of 100 (reference). The results are shown in Tables 1 to 4. Note that larger values indicate better wet steering stability performance.

Dry Steering Stability Performance

The test vehicle was driven on a test course of a dry road surface, a feeling evaluation test on steering stability performance was conducted by a test driver, and the results are expressed as index values and evaluated with Conventional Example being assigned as an index value of 100 (reference). The results are shown in Tables 1 to 4. Note that larger values indicate better dry steering stability performance.

TABLE 1

|  | Conventional Example | Example 1 | Example 2 | Example 3 | Example 4 | Example 5 |
| --- | --- | --- | --- | --- | --- | --- |
| Branch sipe | No | Yes | Yes | Yes | Yes | Yes |
| Relationship between Dm and Db | — | Dm ≥ Db | Dm ≥ Db | Dm ≥ Db | Dm ≥ Db | Dm ≥ Db |
| Value of (Dc − Db) | — | Db × 0.6 | Db × 0.4 | Db × 0.4 | Db × 0.4 | Db × 0.4 |
| Does a main sipe communicate with at least one circumferential main groove? | No | No | No | Yes | Yes | Yes |
| Relationship between Wb and Wm | — | Wb < Wm | Wb < Wm | Wb < Wm | Wb > Wm | Wb > Wm |
| Value of Wb | — | Wm × 0.9 | Wm × 0.9 | Wm × 0.9 | Wm × 1.4 | Wm × 1.6 |
| Value of Wc | — | Wb × 1.3 | Wb × 1.3 | Wb × 1.3 | Wb × 1.3 | Wb × 1.3 |
| Value of Wb (mm) | — | 0.4 | 0.4 | 0.4 | 0.4 | 0.4 |
| Value of Db | — | Dc × 0.4 | Dc × 0.4 | Dc × 0.4 | Dc × 0.4 | Dc × 0.4 |
| Value of Db | — | Dm × 0.1 | Dm × 0.1 | Dm × 0.1 | Dm × 0.1 | Dm × 0.1 |
| Value of Db (mm) | — | 0.7 | 0.7 | 0.7 | 0.7 | 0.7 |
| |θb| (°) | — | 6 | 6 | 6 | 6 | 6 |
| Arrangement of main sipes in tire circumferential direction | Only one-sided main sipe | Only one-sided main sipe | Only one-sided main sipe | Only one-sided main sipe | Only one-sided main sipe | Only one-sided main sipe |
| Presence of subsidiary sipe | No | No | No | No | No | No |

TABLE 1-continued

|  | Conventional Example | Example 1 | Example 2 | Example 3 | Example 4 | Example 5 |
| --- | --- | --- | --- | --- | --- | --- |
| Region where main sipe and branch sipe are formed | — | Sh | Sh | Sh | Sh | Sh |
| Presence of lug groove between circumferential main groove and main sipe | No | No | No | No | No | No |
| Wm + 2Wc | | Wl × 0.7 | Wl × 0.7 | Wl × 0.7 | Wl × 0.7 | Wl × 0.7 |
| Dimension of lug groove in tire width direction relative to dimension of land portion in tire width direction (%) | | 15 | 15 | 15 | 15 | 15 |
| Dm | Dl × 0.15 | Dl × 0.15 | Dl × 0.15 | Dl × 0.15 | Dl × 0.15 | Dl × 0.15 |
| Presence of branch sipe in both Sh | — | One side only | One side only | One side only | One side only | One side only |
| Designation of rotation direction | No | No | No | No | No | No |
| Presence of dimple in Ce | No | No | No | No | No | No |
| Wet steering stability performance | 100 | 105 | 105 | 108 | 107 | 106 |
| Dry steering stability performance | 100 | 103 | 104 | 103 | 105 | 107 |

TABLE 2

|  | Conventional Example | Example 6 | Example 7 | Example 8 | Example 9 | Example 10 |
| --- | --- | --- | --- | --- | --- | --- |
| Branch sipe | No | Yes | Yes | Yes | Yes | Yes |
| Relationship between Dm and Db | — | Dm ≥ Db | Dm ≥ Db | Dm ≥ Db | Dm ≥ Db | Dm ≥ Db |
| Value of (Dc − Db) | — | Db × 0.4 | Db × 0.4 | Db × 0.4 | Db × 0.4 | Db × 0.4 |
| Does a main sipe communicate with at least one circumferential main groove? | No | Yes | Yes | Yes | Yes | Yes |
| Relationship between Wb and Wm | — | Wb > Wm | Wb > Wm | Wb > Wm | Wb > Wm | Wb > Wm |
| Value of Wb | — | Wm × 1.6 | Wm × 1.6 | Wm × 1.6 | Wm × 1.6 | Wm × 1.6 |
| Value of Wc | — | Wb × 1.5 | Wb × 1.5 | Wb × 1.5 | Wb × 1.5 | Wb × 1.5 |
| Value of Wb (mm) | — | 0.4 | 0.6 | 0.6 | 0.6 | 0.6 |
| Value of Db | — | Dc × 0.4 | Dc × 0.4 | Dc × 0.6 | Dc × 0.6 | Dc × 0.6 |
| Value of Db | — | Dm × 0.1 | Dm × 0.1 | Dm × 0.1 | Dm × 0.3 | Dm × 0.3 |
| Value of Db (mm) | — | 0.7 | 0.7 | 0.7 | 0.7 | 0.9 |
| |θb| (°) | — | 6 | 6 | 6 | 6 | 6 |
| Arrangement of main sipes in tire circumferential direction | Only one-sided main sipe | Only one-sided main sipe | Only one-sided main sipe | Only one-sided main sipe | Only one-sided main sipe | Only one-sided main sipe |
| Presence of subsidiary sipe | No | No | No | No | No | No |
| Region where main sipe and branch sipe are formed | — | Sh | Sh | Sh | Sh | Sh |
| Presence of lug groove between circumferential main groove and main sipe | Yes | Yes | Yes | Yes | Yes | Yes |
| Wm + 2Wc | | Wl × 0.7 | Wl × 0.7 | Wl × 0.7 | Wl × 0.7 | Wl × 0.7 |
| Dimension of lug groove in tire width direction relative to dimension of land portion in tire width direction (%) | | 15 | 15 | 15 | 15 | 15 |

TABLE 2-continued

|  | Conventional Example | Example 6 | Example 7 | Example 8 | Example 9 | Example 10 |
|---|---|---|---|---|---|---|
| Dm | Dl × 0.15 | Dl × 0.15 | Dl × 0.15 | Dl × 0.15 | Dl × 0.15 | Dl × 0.15 |
| Presence of branch sipe in both Sh | — | One side only | One side only | One side only | One side only | One side only |
| Designation of rotation direction | No | No | No | No | No | No |
| Presence of dimple in Ce | No | No | No | No | No | No |
| Wet steering stability performance | 100 | 108 | 110 | 109 | 108 | 109 |
| Dry steering stability performance | 100 | 107 | 106 | 107 | 109 | 109 |

TABLE 3

|  | Conventional Example | Example 11 | Example 12 | Example 13 | Example 14 | Example 15 |
|---|---|---|---|---|---|---|
| Branch sipe | No | Yes | Yes | Yes | Yes | Yes |
| Relationship between Dm and Db | — | Dm ≥ Db | Dm ≥ Db | Dm ≥ Db | Dm ≥ Db | Dm ≥ Db |
| Value of (Dc − Db) | — | Db × 0.4 | Db × 0.4 | Db × 0.4 | Db × 0.4 | Db × 0.4 |
| Does a main sipe communicate with at least one circumferential main groove? | No | Yes | Yes | Yes | Yes | Yes |
| Relationship between Wb and Wm | — | Wb > Wm | Wb > Wm | Wb > Wm | Wb > Wm | Wb > Wm |
| Value of Wb | — | Wm × 1.6 | Wm × 1.6 | Wm × 1.6 | Wm × 1.6 | Wm × 1.6 |
| Value of Wc | — | Wb × 1.5 | Wb × 1.5 | Wb × 1.5 | Wb × 1.5 | Wb × 1.5 |
| Value of Wb (mm) | — | 0.6 | 0.6 | 0.6 | 0.6 | 0.6 |
| Value of Db | — | Dc × 0.6 | Dc × 0.6 | Dc × 0.6 | Dc × 0.6 | Dc × 0.6 |
| Value of Db | — | Dm × 0.3 | Dm × 0.3 | Dm × 0.3 | Dm × 0.3 | Dm × 0.3 |
| Value of Db (mm) | — | 0.9 | 0.9 | 0.9 | 0.9 | 0.9 |
| $|\theta b|$ (°) | — | 4 | 4 | 4 | 4 | 4 |
| Arrangement of main sipes in tire circumferential direction | Only one-sided main sipe | Only one-sided main sipe | One-sided main sipe and two-sided main sipe alternately | One-sided main sipe and two-sided main sipe alternately | One-sided main sipe and two-sided main sipe alternately | One-sided main sipe and two-sided main sipe alternately |
| Presence of subsidiary sipe | No | No | No | Yes | Yes | Yes |
| Region where main sipe and branch sipe are formed | — | Sh | Sh | Sh | Ce and Sh | Ce and Sh |
| Presence of lug groove between circumferential main groove and main sipe | Yes | Yes | Yes | Yes | Yes | Yes |
| Wm + 2Wc | Wl × 0.7 | Wl × 0.7 | Wl × 0.7 | Wl × 0.7 | Wl × 0.7 | Wl × 0.9 |
| Dimension of lug groove in tire width direction relative to dimension of land portion in tire width direction (%) | 15 | 15 | 15 | 15 | 15 | 15 |
| Dm | Dl × 0.15 | Dl × 0.15 | Dl × 0.15 | Dl × 0.15 | Dl × 0.15 | Dl × 0.15 |
| Presence of branch sipe in both Sh | — | One side only | One side only | One side only | One side only | One side only |
| Designation of rotation direction | No | No | No | No | No | No |
| Presence of dimple in Ce | No | No | No | No | No | No |
| Wet steering stability performance | 100 | 109 | 112 | 113 | 115 | 116 |
| Dry steering stability performance | 100 | 110 | 108 | 107 | 107 | 108 |

TABLE 4

|  | Conventional Example | Example 16 | Example 17 | Example 18 | Example 19 | Example 20 |
| --- | --- | --- | --- | --- | --- | --- |
| Branch sipe | No | Yes | Yes | Yes | Yes | Yes |
| Relationship between Dm and Db | — | Dm ≥ Db | Dm ≥ Db | Dm ≥ Db | Dm ≥ Db | Dm ≥ Db |
| Value of (Dc − Db) | — | Db × 0.4 | Db × 0.4 | Db × 0.4 | Db × 0.4 | Db × 0.4 |
| Does a main sipe communicate with at least one circumferential main groove? | No | Yes | Yes | Yes | Yes | Yes |
| Relationship between Wb and Wm | — | Wb > Wm | Wb > Wm | Wb > Wm | Wb > Wm | Wb > Wm |
| Value of Wb | — | Wm × 1.6 | Wm × 1.6 | Wm × 1.6 | Wm × 1.6 | Wm × 1.6 |
| Value of Wc | — | Wb × 1.5 | Wb × 1.5 | Wb × 1.5 | Wb × 1.5 | Wb × 1.5 |
| Value of Wb (mm) | — | 0.6 | 0.6 | 0.6 | 0.6 | 0.6 |
| Value of Db | — | Dc × 0.6 | Dc × 0.6 | Dc × 0.6 | Dc × 0.6 | Dc × 0.6 |
| Value of Db | — | Dm × 0.3 | Dm × 0.3 | Dm × 0.3 | Dm × 0.3 | Dm × 0.3 |
| Value of Db (mm) | — | 0.9 | 0.9 | 0.9 | 0.9 | 0.9 |
| |θb| (°) | — | 4 | 4 | 4 | 4 | 4 |
| Arrangement of main sipes in tire circumferential direction | Only one-sided main sipe | One-sided main sipe and two-sided main sipe alternately | One-sided main sipe and two-sided main sipe alternately | One-sided main sipe and two-sided main sipe alternately | One-sided main sipe and two-sided main sipe alternately | One-sided main sipe and two-sided main sipe alternately |
| Presence of subsidiary sipe | No | Yes | Yes | Yes | Yes | Yes |
| Region where main sipe and branch sipe are formed | — | Ce and Sh | Ce and Sh | Ce and Sh | Ce and Sh | Ce and Sh |
| Presence of lug groove between circumferential main groove and main sipe | Yes | Yes | Yes | Yes | Yes | Yes |
| Wm + 2Wc | Wl × 0.9 | Wl × 0.9 | Wl × 0.9 | Wl × 0.9 | Wl × 0.9 | Wl × 0.9 |
| Dimension of lug groove in tire width direction relative to dimension of land portion in tire width direction (%) | 15 | 25 | 25 | 25 | 25 | 25 |
| Dm | Dl × 0.15 | Dl × 0.15 | Dl × 0.25 | Dl × 0.25 | Dl × 0.25 | Dl × 0.25 |
| Presence of branch sipe in both Sh | — | One side only | One side only | Both sides | Both sides | Both sides |
| Designation of rotation direction | No | No | No | No | Yes | Yes |
| Presence of dimple in Ce | No | No | No | No | No | Yes |
| Wet steering stability performance | 100 | 118 | 120 | 122 | 124 | 126 |
| Dry steering stability performance | 100 | 107 | 106 | 105 | 106 | 106 |

Tables 1 to 4 show that each of the pneumatic tires according to Examples 1 to 20 that comply with the technical scope of the present technology (that is, the pneumatic tires in which a branch sipe is provided in a land portion and the relationship between the depth of (a body portion) of a main sipe and the depth of a branch sipe is improved) is improved in wet steering stability performance and dry steering stability performance in a well-balanced manner, when compared with the pneumatic tire according to Conventional Example that does not comply with the technical scope of the present technology.

The invention claimed is:

1. A pneumatic tire, comprising:
   at least one land portion defined and formed by a plurality of circumferential main grooves provided in a tread surface; and
   a main sipe provided in the land portion, the main sipe comprising a body portion and a chamfered portion formed in at least one side of the body portion, the pneumatic tire comprising a branch sipe branching from the chamfered portion, and
   a depth Dm of the body portion and a depth Db of the branch sipe satisfying Dm≥Db, wherein
   a depth Dc of the chamfered portion and the depth Db of the branch sipe satisfy 0≤Dc−Db≤Db×0.5, and
   the branch sipe extends from the main sipe only on one side in the circumferential direction and terminates within the land portion.

2. The pneumatic tire according to claim 1, wherein the main sipe communicates with at least one of the circumferential main grooves.

3. The pneumatic tire according to claim 1, wherein a width Wb of the branch sipe and a width Wm of the body portion of the main sipe satisfy Wb>Wm.

4. The pneumatic tire according to claim 3, wherein the width Wb of the branch sipe and the width Wm of the body portion of the main sipe satisfy Wm×1.5≤Wb≤Wm×4.0.

5. The pneumatic tire according to claim 1, wherein a width Wc of the chamfered portion and a width Wb of the branch sipe satisfy Wb×1.3≤Wc≤Wb×3.0.

6. The pneumatic tire according to claim 1, wherein a width Wb of the branch sipe satisfies 0.5 mm≤Wb≤3.0 mm.

7. The pneumatic tire according to claim 1, wherein the depth Db of the branch sipe and a depth Dc of the chamfered portion satisfy Dc×0.5≤Db≤Dc.

8. The pneumatic tire according to claim 1, wherein the depth Dm of the body portion of the main sipe and the depth Db of the branch sipe satisfy Dm×0.2≤Db≤Dm×0.9.

9. The pneumatic tire according to claim 1, wherein the depth Db of the branch sipe satisfies 0.8 mm≤Db≤2.5 mm.

10. The pneumatic tire according to claim 1, wherein an absolute value |θb| of an inclination angle of the branch sipe with respect to a tire circumferential direction is 5° or less.

11. The pneumatic tire according to claim 1, wherein a one-sided main sipe communicating only with a circumferential main groove on one side and a two-sided main sipe communicating with circumferential main grooves on both sides are alternately provided in a tire circumferential direction.

12. The pneumatic tire according to claim 11, wherein at least one subsidiary sipe is provided between the one-sided main sipe and the two-sided main sipe in the tire circumferential direction.

13. The pneumatic tire according to claim 1, wherein, a ground contact region is divided into four regions in a tire width direction and two regions among the four regions at a center in the tire width direction are regarded as a center region, and the main sipe and the branch sipe are provided in the center region.

14. The pneumatic tire according to claim 1, wherein an inclined groove or a lug groove is provided between the circumferential main groove and the main sipe, and a width Wl of the inclined groove or the lug groove and a width (Wm+2Wc) of the main sipe satisfy Wl×0.8≤(Wm+2Wc)≤Wl×1.2.

15. The pneumatic tire according to claim 14, wherein a dimension of the inclined groove or the lug groove in a tire width direction is 20% or more and 40% or less of a dimension of the land portion in the tire width direction.

16. The pneumatic tire according to claim 14, wherein a depth Dl of the inclined groove or the lug groove and the depth Dm of the body portion of the main sipe satisfy Dl×0.2≤Dm≤Dl×0.8.

17. The pneumatic tire according to claim 1, wherein, in a state where a load of 70% of a maximum load capacity is applied, a ground contact region is divided into four regions in a tire width direction and two regions among the four regions on both outer sides in the tire width direction are regarded as shoulder regions, and the branch sipe is provided in both of the shoulder regions.

18. The pneumatic tire according to claim 1, wherein a rotation direction is designated, an end portion of the branch sipe on an opposite side of the chamfered portion is provided on a leading side, and an end portion of the branch sipe on a side of the chamfered portion is provided on a trailing side.

19. The pneumatic tire according to claim 1, wherein a dimple is provided in at least a center region.

* * * * *